Dec. 11, 1956
C. I. BOHLEN
2,773,718
FLOOR CONSTRUCTION WITH INTEGRAL CROSS-SILLS
Filed Aug. 20, 1953
2 Sheets-Sheet 2
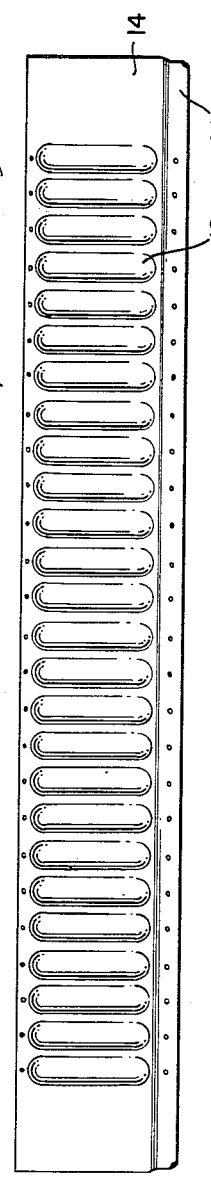
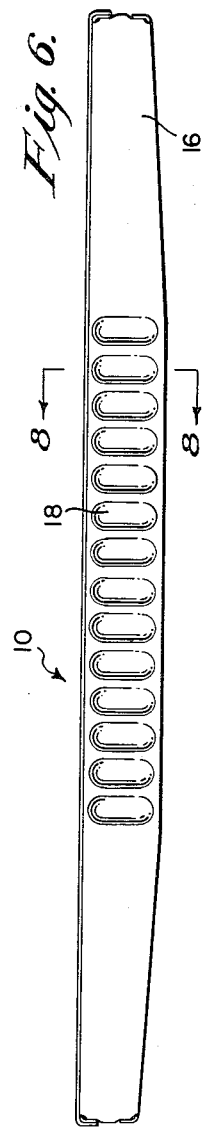
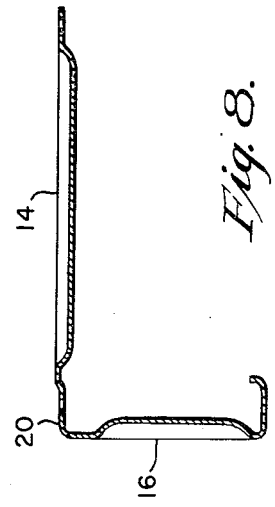
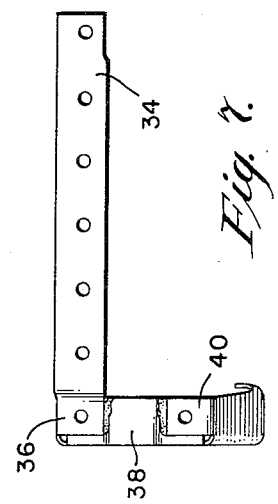
*INVENTOR.*
CHARLES I. BOHLEN
BY
Caesar and Rivise
ATTORNEYS.

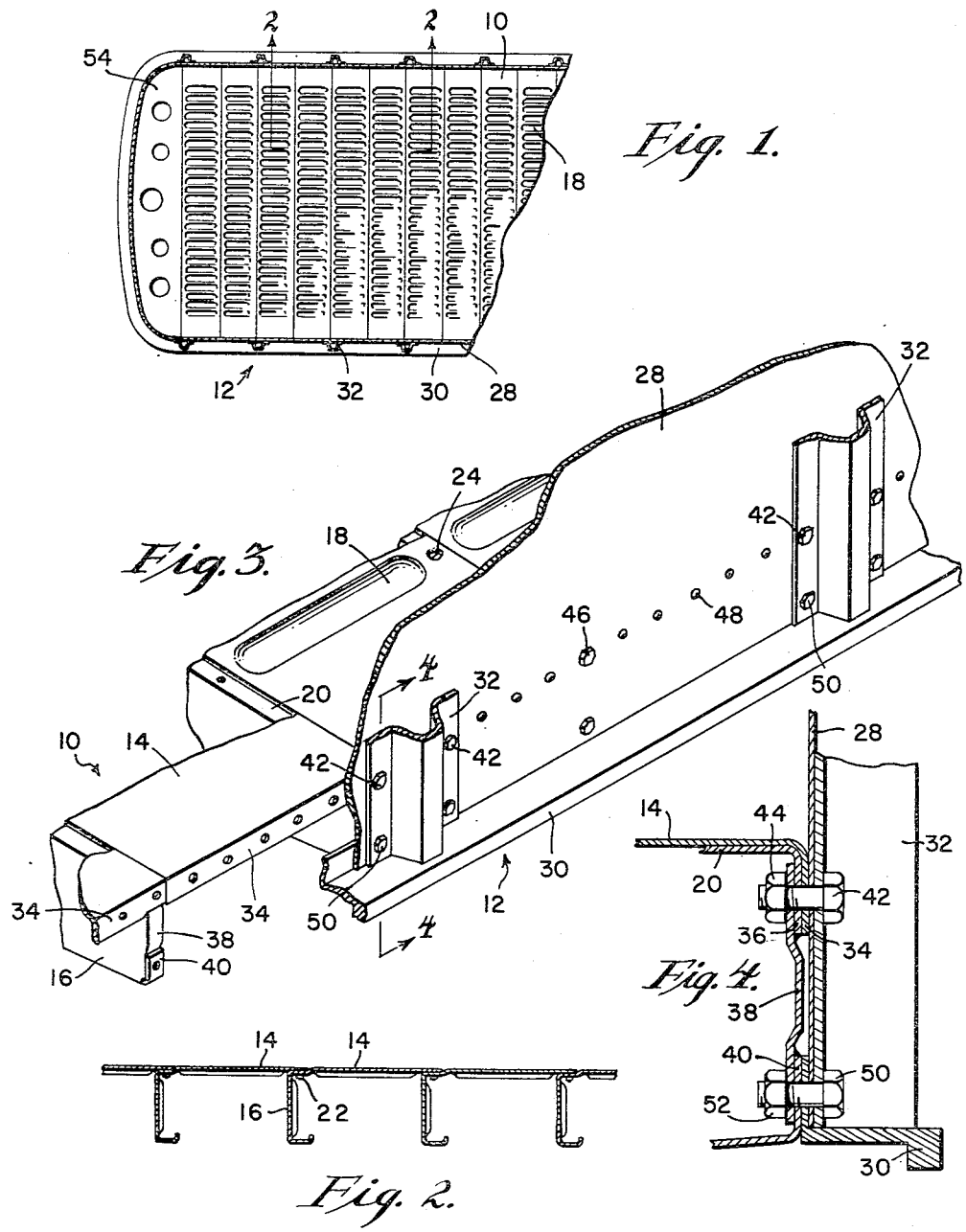

United States Patent Office

2,773,718
Patented Dec. 11, 1956

2,773,718

FLOOR CONSTRUCTION WITH INTEGRAL CROSS-SILLS

Charles I. Bohlen, Doylestown, Pa., assignor, by mesne assignments, to Fruehauf Trailer Company, Detroit, Mich., a corporation of Michigan Application August 20, 1953, Serial No. 375,449

4 Claims. (Cl. 296—28)

This invention relates to a floor construction for truck trailers and the like comprising interconnected sections having integral depending cross-sills, the primary object of which is to eliminate the labor and expense of providing separate cross-sills and the labor and expense of connecting floor sections thereto.

Another object of the invention is to provide a floor surface in one single operation as opposed to the several distinct operations required with separate floor sills.

Another object of the invention is to provide a floor construction which effects considerable savings in the cost of materials and the time of producing the sections and assembling them on the trailer, thus reducing the overall cost of the floor.

Another object of the invention is to provide a floor constructed of sections having integral cross-sills wherein the floor is at least as structurally sound as one supported upon separate floor sills.

Another object of the invention is to provide floor sections including integral cross-sills and means for overlappingly connecting the sections to provide a resultant floor construction having a substantially flat or planar floor surface free from obstructions.

Yet another object of the invention is to provide floor sections including integral cross-sills and simplified means for securing the ends of the sections to the sides of the trailer.

These and other objects will become more apparent as the following description proceeds in conjunction with the accompanying drawings, wherein:

Figure 1 is a fragmentary top plan view of the floor, the forward end of the trailer being shown;

Figure 2 is a sectional view taken on the line 2—2 of Figure 1;

Figure 3 is a fragmentary enlarged perspective view of the floor and illustrating the manner of securing it to one side of the trailer;

Figure 4 is a sectional view taken on the line 4—4 of Figure 3;

Figure 5 is a top plan view of one of the floor sections;

Figure 6 is a side elevational view of the floor section;

Figure 7 is an end elevational view of the floor section; and

Figure 8 is a sectional view taken on the line 8—8 of Figure 6.

Specific reference will now be made to the drawings wherein similar reference characters are used for corresponding elements throughout.

The present invention comprises a plurality of preferably metallic floor sections 10 which extend transversely of the trailer 12, as shown in Figure 1, and are longitudinally arranged and interconnected to provide a complete trailer floor. Each floor section is substantially L-shaped in cross-section and includes a horizontal plate 14 integral with a depending cross-sill 16. To strengthen the floor section and for an additional purpose soon to appear, the horizontal and vertical plates 14 and 16 are provided with corrugations 18 spaced along the length of the plates. The horizontal plate 14 is provided adjacent its juncture with the cross-sill 16 with a transverse offset portion or depression 20 equal in depth at least to the thickness of the horizontal plate.

Thus, when the free end of one horizontal plate is placed on the depressed portion 20 of an adjacent horizontal plate, see Figure 2, a floor surface results which is substantially flat or planar. The sections are secured to each other in overlapped relationship at these depressed portions 20 by any suitable means such as by transversely spaced head bolts 22, rivets or spotwelds. Since the heads 24 of the bolts 22 are countersunk the floor surface is not only planar but also smooth so that no obstructions appear on the surface thereof to interfere with the movement of loading trucks thereon or the sliding of load items thereover.

While any suitable means may be employed to secure the assembled ends of the sections to the sides of a trailer, several means are preferred especially where the trailer is of the type including metallic sides or skins 28 carrying longitudinal rub rails 30 and longitudinally spaced vertical posts 32.

These means comprise a depending apertured flange 34 at both ends of the horizontal plate 14 of each floor section and an offset or depressed portion 36 provided in the flange adjacent the cross-sill, as shown in Figure 7. Both ends of the cross-sill 14 of each floor section include an abutment portion 38 and an upstanding apertured flange 40 at its lower end. When the horizontal plates of adjacent floor sections are overlapped, as shown in Figure 3, the depending flanges 34 also overlap at the depressed portions 36 to provide substantially flat longitudinal ends for abutment against the entire length of the inner surfaces of the side skins 28.

The headed bolts 42 and nuts 44 securing the posts 32 to the skins 28 also secure the end flanges 34 of the horizontal plates to the skins, one of said bolts 42 passing through the overlapped end flanges 34 at the depressed portion 36. One or more additional headed bolts 46 may be used to secure the overlapped end flanges to the skin in the area between the posts 32 as shown in Figure 3. Additionally, it is preferred that rivets 48 be provided between the posts 32 to further secure the skin 28 to the depending end flanges 34.

One of the headed bolts 50 and nuts 52 employed to secure the posts 32 to the rub rail 30 and skin 28 serves also to secure the upstanding end flange 40 of the cross-sill 16 to the skin 28.

Any suitable curved plate 54 may be used to complete the floor construction at the forward end of the trailer. Thus it will be seen that a trailer floor is provided utilizing sections with integral cross-sills and simplified means for securing the sections to each other and to the trailer so that a smooth, planar floor results from a single assembly operation.

While a preferred embodiment of the invention has been described herein, minor variations may be made by skilled artisans without departing from the spirit of the invention and the scope of the appended claims.

I claim:

1. A floor construction for trailers comprising a plurality of transverse sections, each section being generally L-shaped and including a depending cross-sill integral with a horizontally extending plate, said horizontal plate having a transverse depressed area at its juncture with the cross-sill at least equal in depth to the thickness of the horizontal plate, means joining the free end of one horizontal plate to an adjacent horizontal plate at the depressed area to provide a substantially flat floor surface, and means connecting the ends of the sections to the sides of the trailer, said last-named means including flanges depending from the ends of the horizontal plates and flanges upstanding from the ends of the cross-sills and means securing said flanges to the sides of the trailer.

2. The combination of claim 1 wherein each depending flange of the horizontal plates includes a depression adjacent the cross-sill at least equal in depth to the thickness of the depending flange, said flange depression receiving the free end of the depending flange of an adjacent horizontal plate to provide a floor construction having substantially flat longitudinal ends.

3. In combination with a trailer body having side walls, a floor construction comprising a plurality of sections extending transversely between the side walls, each section being generally L-shaped and including a depending cross-sill integral with a horizontally extending plate, a depression in said horizontal plate along its length and at its juncture with said cross-sill, said depression being of a depth at least equal to the thickness of said horizontal plate, means joining the free end of one horizontal plate to an adjacent horizontal plate at said depression to provide a substantially flat floor surface, flanges depending from the ends of said horizontal plate, a depression in each of said end flanges adjacent said cross-sill of a depth at least equal to the thickness of the end flange, said flange depression receiving the free end of the end flange of an adjacent horizontal plate, and bolt means securing the side walls of the trailer body to the end flanges of the horizontal plates, one of said bolt means also serving to join the overlapped end flanges of adjacent floor sections.

4. The combination of claim 3 wherein each end of said cross-sills includes flanges abutting against the side walls of the trailer and means securing the side walls to said cross-sill end flanges.

References Cited in the file of this patent

UNITED STATES PATENTS

| | | |
|---|---|---|
| 1,900,711 | Howard | Mar. 7, 1933 |
| 1,986,998 | Burgess et al. | Jan. 8, 1935 |
| 2,042,797 | Nechin | June 2, 1936 |
| 2,056,137 | Idoine | Sept. 29, 1936 |
| 2,363,170 | Fontaine | Nov. 21, 1944 |
| 2,482,592 | Miller et al. | Sept. 20, 1949 |
| 2,565,709 | Watter | Aug. 28, 1951 |
| 2,569,965 | Wiedman | Oct. 2, 1951 |
| 2,621,059 | Ridgway | Dec. 9, 1952 |